Aug. 4, 1953 E. L. C. WHITE 2,647,946

PULSE GENERATING APPARATUS

Filed June 29, 1949 2 Sheets-Sheet 1

Inventor
E. L. C. WHITE

By J. O. Ollier
Attorney

Aug. 4, 1953 E. L. C. WHITE 2,647,946

PULSE GENERATING APPARATUS

Filed June 29, 1949 2 Sheets-Sheet 2

Inventor
E. L. C. WHITE
By J. O. Ollier
Attorney

Patented Aug. 4, 1953 2,647,946

UNITED STATES PATENT OFFICE 2,647,946

PULSE GENERATING APPARATUS

Eric Lawrence Casling White, Richings Way, Iver, England, assignor to Electric & Musical Industries Limited, Hayes, England, a company of Great Britain Application June 29, 1949, Serial No. 102,130
In Great Britain July 1, 1948

8 Claims. (Cl. 178—7.5)

Figure 1:
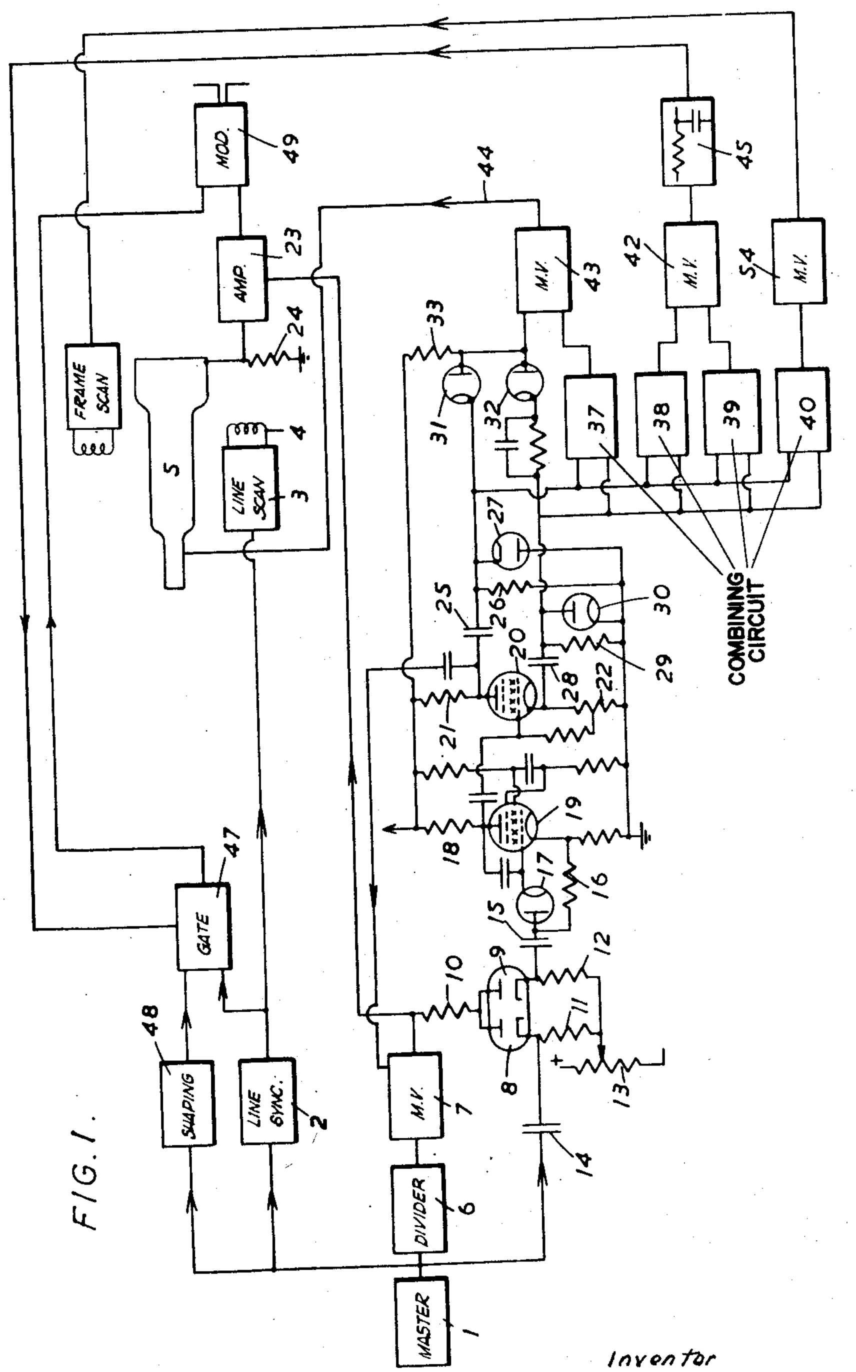

This invention relates to electrical pulse generating apparatus.

In television transmitting equipment which operates with interlaced scanning, the line and frame frequency camera triggering pulses and other pulses of line and frame frequency such as synchronising pulses, suppression pulses, blackout pulses and keying pulses are usually generated under the control of a single master oscillator which generates master pulses at twice-line frequency. It is desirable for a variety of reasons that the pulses of frame frequency should have their leading and trailing edges occurring accurately at definite times in the line periods, that is the periods between the leading edges of successive line synchronising pulses.

The object of the present invention is to provide improved pulse generating apparatus such as is suitable for use in television and like equipment with a view to achieving the desired accuracy.

According to the present invention there is provided electrical pulse generating apparatus comprising means for generating potential variations of stepped-waveform under the control of master pulses applied to said apparatus so that the timing of the potential increments in said stepped-waveform variations are determined by said master pulses, and means for generating periodically recurring pulses the timing of whose leading and trailing edges are respectively determined by predetermined increments in said stepped-waveform variations.

According to one form of the present invention there is provided an electrical pulse generating apparatus comprising means for generating potential variations of stepped-waveform under the control of master pulses applied to said apparatus so that the timing of the potential increments of said stepped-waveform variations are determined by said master pulses, and means for generating a plurality of series of periodically recurring pulses under the control of said stepped-waveform variations, the arrangement being such that the timing of the leading and trailing edges of said pulses are respectively determined by predetermined increments in said stepped-waveform variations, the trailing edges of the pulses in the different series being determined by different increments of the stepped-waveform variations.

According to one application of the present invention there is provided a television apparatus having means for generating pulses of frame frequency under the control of pulses of twice-line frequency, said apparatus comprising a source of said pulses of double-line frequency, means for generating potential variations of stepped-waveform the timing of whose potential increments are determined by said twice-line frequency pulses, and means for generating pulses of frame frequency the timing of whose leading and trailing edges are respectively determined by predetermined increments in said stepped-waveform variations.

Figure 2:
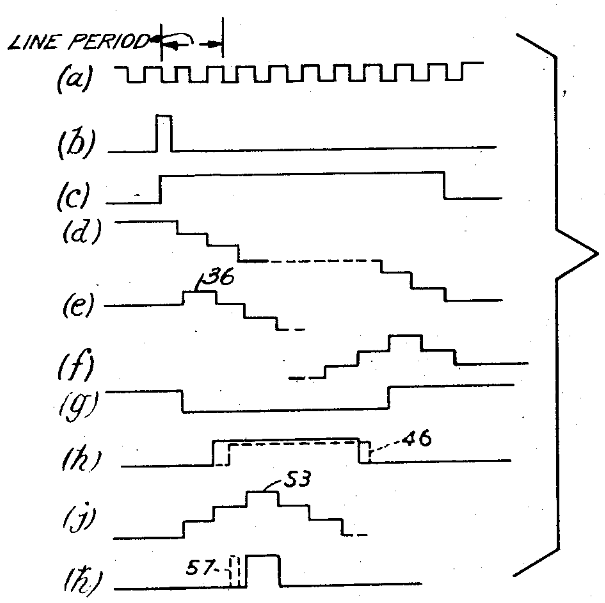
Figures 3, 4:
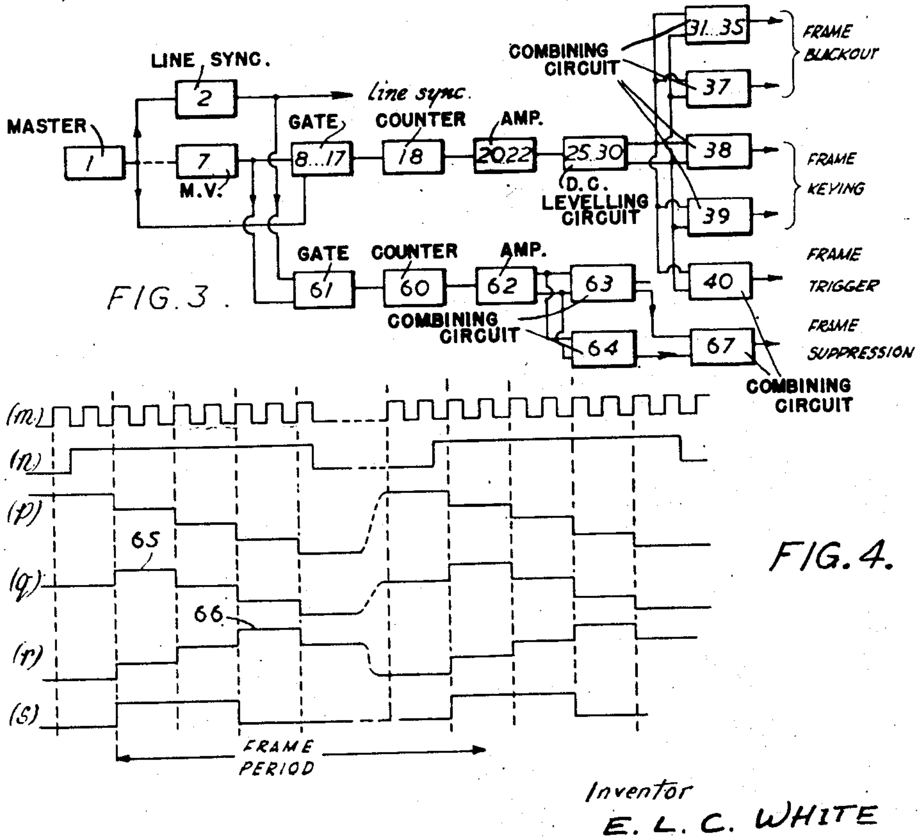

In order that the said invention may be clearly understood and readily carried into effect, the same will now be more fully described with reference to the accompanying drawings, in which:

Figure 1 illustrates diagrammatically and partly in block form one example of television transmitting equipment in accordance with the present invention, Figure 2 illustrates waveforms explanatory of Figure 1, Figure 3 illustrates a modification of Figure 1, and Figure 4 illustrates waveforms explanatory of Figure 2.

It will be assumed that the transmitter illustrated is designed for a television system which operates at a rate of 25 complete scanning traversals per second, each comprising two frames of 202½ lines with the lines in alternate frames arranged to interlace. The transmitter illustrated comprises a master oscillator 1 arranged to generate master pulses at twice-line frequency and each of a duration equal to one-quarter of a line period, the master pulse waveform being indicated at *a* in Figure 2 where the pulses are shown with a negative polarity. The pulse waveform *a* is utilised to control the generation of synchronising pulses of line frequency by a line frequency pulse generator 2. The line frequency pulses serve to synchronise the line frequency scanning generator 3 which feeds a line frequency sawtooth waveform to the line scanning coils 4 of the television transmission tube 5 used in the transmitter. The pulses of line frequency from the generator 2 are arranged to have a duration of about 0.05 to 0.1 of a line period and have their leading edges synchronised with alternate leading edges of the pulses *a*. The construction of the devices 1, 2 and 3 may be conventional so they are not described in detail. The pulse waveform *a* is also fed from the oscillator 1 to a pulse operated dividing circuit 6 such, for example, as described in United States Patent No. 2,113,011 or in co-pending United States Patent application Ser. No. 727,250, the circuit 6 being arranged to divide the applied pulses by 405 so as to produce frame frequency pulses, such as that indicated at *b* in Figure 2. The frame frequency pulses *b* are applied to a multivibrator 7 or other suitable triggered device so as to switch the multivibrator from one equilibrium condition to a second equilibrium condition and cause the generation of a positive pulse at the anode of one of the valves of the multivibrator once per frame. The positive pulse indicated in Figure 2*c* is fed to a switching circuit which comprises two diode valves 8 and 9 having a common anode impedance 10 and separate cathode impedances 11 and 12, which latter are returned to the tapping on a biassing potentiometer 13. The pulses *c* are fed to the anodes of the valves 8 and 9 as shown, whilst the master pulse waveform *a* is fed to the cathode of the valve 8 from the master oscillator 1 via a condenser 14. The cathode of the valve 9 is coupled to a differentiating circuit comprising a condenser 15 and resistance 16. The diode valves 8 and 9 are normally biassed to cut-off by the potentiometer 13 so that the master pulses *a* are not transmitted to the circuit 15, 16. However, the pulses *c* are arranged to be of such amplitude as to render the valves 8 and 9 conducting for as long as the pulses last, so that for the duration of each pulse *c*, the master pulses are transmitted to the circuit 15, 16 and differentiated thereby. The differentiating circuit 15, 16 is coupled via a diode 17 to a transitron step-counting circuit indicated generally at 18 and comprising a pentode valve 19. The diode 17 transmits only the differentiated trailing edges of the master pulses *a* to the step-counting circuit 18, so there is set up at the anode of the valve 19, during each pulse *c* a stepped-waveform potential indicated at *d* in Figure 2, having increments at twice-line frequency and occurring at approximately 0.25 and 0.75 of line periods, the increments being negative at the anode of the valve 19. The stepped-waveform potential is fed to an amplifying valve 20 having anode and cathode impedances 21 and 22, so that paraphase versions of the waveform *d* are set up respectively at the anode and cathode of the valve 20. The transitron circuit 18 is arranged to re-set itself in known manner after a number of the pulses *a* have been counted, corresponding to the longest pulse of frame frequency which it is required to generate so terminating one cycle of the stepped-waveform potential *d*. One version of the potential *d*, say from the anode of the valve 20, is fed back as shown to multivibrator 7 where it is applied to one of the valves, the multivibrator 7 being arranged so that the last increment of each cycle of the stepped-waveform potential *d* switches the multivibrator back to its first equilibrium condition and so terminates the respective positive pulse *c*. The step-counting circuit 18 then remains dormant until the occurrence of the next frame frequency pulse *b* from the dividing circuit 6. The frame frequency suppression pulse is normally the longest pulse of frame frequency which is required at the transmitter, and therefore the pulses *c* are used as the frame suppression pulses, and in the present example are fed to the video amplifier 23 to reduce the gain thereof to zero during the intervals between alternate frame scanning traversals in the television transmission tube 5, the output of the tube 5 being applied to the amplifier 23 from the output load impedance 24 of the tube 5.

The version of the stepped-waveform potential *d* set up at the anode of the valve 20 is referred to a suitable datum voltage by a D. C. inserting circuit comprising a condenser 25, resistance 26 and diode valve 27, while the version of the potential *d* set up at the cathode of the valve 20 is likewise referred to suitable datum level by a D. C. inserting circuit 28, 29, and 30. The paraphase versions of the potential *d* are then fed in parallel to the cathodes of two diode valves 31 and 32, having a common anode impedance 33, the valve 32 having a biassing resistance 34 shunted by a condenser 35 in its cathode lead. The circuit elements 20, 21, 22 and 25 . . . 35 are arranged as described on page 587 of Part IIIA, No. 13 (vol. 94) of the Journal of the Institute of Electrical Engineers, and as described in said publication, the elements 31 . . . 35 serve to combine the waveform set up at the anode and cathode of the valve 20 and form a composite waveform at the anodes of the valves 31 and 32 having a most positive level during the period of any given step in the waveform *d*, determined by the value of the resistance 34. In the present case the resistance 34 is given such a value that the most positive level occurs, after the first increment in waveform *d*, part of the composite waveform including the most positive level 36, being shown at *e* in Figure 2. The waveforms from the anode and cathode of the valve 20 are fed to a series of other combining circuits 37 . . . 40 which, since they are similar to the circuit 31 . . . 35 apart from the value of the biassing resistance, are shown merely in block form. The biassing resistance in the circuit 37 has such a value that the most positive level in its output occurs before the second last increment of the waveform *d*. The waveforms *e* and *f* are fed to a multivibrator 43, the waveform *e* serving to trigger the multivibrator from one equilibrium condition to another and the waveform *f* serving to trigger it back to the first condition. The time constants of the multivibrator are such that it remains in the first condition until the next occurrence of level 36 in the waveform *e* when the cycle of operation recommences, the output of the multivibrator being frame frequency pulses of shorter duration than the suppression pulses and indicated at Figure 2*g*. The pulses *g* are are shown as of negative polarity and they are employed as black-out pulses, being fed as shown by the lead 44 to the modulator electrode of the television transmission tube 5 so as to extinguish the electron beam therein during the frame flyback times.

The outputs of the combining circuits 38 and 39 are fed to a further multivibrator 42 where they serve to control the generation of further frame frequency pulses, the biassing resistances in the circuits 38 and 39 being of such value that the pulses obtained from the multivibrator 42 are of slightly shorter duration than the black-out pulses *g*, as shown in Figure 2*h*. The pulses *h* are utilised as frame keying pulses for controlling the transmission of frame synchronising signals from the transmitter. The frame keying pulses are required to start and finish between 0.4 and 0.5 of a line period in every second frame, and to start and finish between 0.9 and 1.0 of a line period in the intervening frames. In order to achieve this timing, the keying pulses are applied to a delay circuit 45 having a delay time of about 20 microseconds, and the resultant keying pulses, one of which is indicated by dotted lines 46 in Figure 2h are fed as shown to a gating circuit 47 the input to which comprises line frequency synchronising pulses from the generator 2, and in addition, broadened twice-line frequency pulses generated by a generator 48 under control of pulses from the master oscillator 1. The leading edges of the broadened pulses are synchronised with the pulses from the generator 2, while the trailing edges of the broadened pulses occur at 0.9 of line periods. The gating circuit is such that during the intervals between the keying pulses the gating circuit allows the passage of the line frequency synchronising pulses from the generator 2 to the modulator circuit 49 of the transmitter, while during the occurrence of the keying pulses it allows the passage to the circuit 49 of the broadened twice-line frequency pulses from the generator 48. The synchronising signal waveform fed to the circuit 49 therefore comprises pulses of short duration interspersed with groups of broadened twice-line frequency pulses, the groups recurring at frame frequency. Since the circuits 45, 47 and 48 may be of conventional construction, they are shown merely in block form. In the modulator circuit 49 the synchronising signal waveform is mixed in known manner with the video signals from the amplifier 23 and modulated on to the carrier. As an alternative to delaying the keying pulses *h* it is possible to delay the step-waveform variation fed to the circuits 38 and 39.

The composite waveform fed from the combining circuit 40 is indicated in Figure 2*j* and is arranged to have its most positive level 53 during each cycle at a convenient time wholly within the respective black-out pulse *g* and it is fed to an amplifier 54 arranged to be so biassed that it remains cut off except during the occurrence of the level 53 in the waveform *j*. The output of the amplifier 54 therefore comprises frame frequency pulses of a duration of half a line period and commencing in alternate frames at 0.25 and 0.75 of a line period respectively. One of said pulses is indicated in Figure 2*k* and said pulses are fed to a frame frequency scanning generator 55 which feeds a frame frequency sawtooth waveform to the frame scanning coils 56 for the tube 5, the pulses *k* terminating the cycles of the waveform during the intervals when the beam in the tube 5 is extinguished by the black-out pulses *g*. It has been found preferable for the frame frequency triggering pulses *k* to start at 0.25 and at 0.75 of line periods as aforesaid, since this has the advantage that in any frame the line synchronising pulse immediately preceding the camera triggering pulse of frame frequency has terminated before the latter triggering pulse starts. This is indicated in Figure 2*k* in which it is assumed that the frame triggering pulse shown starts at 0.25 of a line period, the next preceding line synchronising pulse being shown dotted at 57, and it has the effect of reducing the risk of incorrect interlacing occurring due to interference between line and frame scanning circuits 3 and 55. There is, moreover, no disadvantage in causing the ends of the frame frequency triggering pulses *k* to occur at 0.25 and 0.75 of a line period alternately and it is therefore convenient, as is the case in the circuit described, to arrange that the increments in the stepped-waveform potential *d* occur at 0.25 and 0.75 of the line periods. In some applications it may, however, be desirable for other reasons to cause the potential increments to occur in synchronism with the leading edges of the pulses *a*.

It will be appreciated that since both the leading and trailing edges of the pulses *f*, *g* and *k* generated under control of the stepped-waveform potential *d* are determined by particular potential increments thereof, both the duration and timing of each of the said frame frequency pulses can be varied by times which are integral multiples of a half line period, by adjusting the resistance 34 and the corresponding resistances in the circuits 37 . . . 40.

A more pleasing appearance to the raster on a receiving tube can be obtained if the frame suppression pulses start and stop at the beginning of a line period in all frames. This entails either an unequal spacing between alternate frame suppression pulses, or frame suppression pulses of unequal durations, the variation being one line period in each case. Figure 3 illustrates a modification wherein the former alternative is adopted and according thereto the output of the multivibrator 7 is not utilised as the frame suppression pulse waveform, but functions merely as keying pulses which allow operation of the stepped-waveform generator 18, and also a further stepped-waveform generator 60, similar to the generator 18. Moreover, in this modification the pulses *c* are arranged to exceed the duration of the suppression pulses which it is required to generate and to start and to finish at approximately 0.25 of line periods in, say, odd-numbered frames and at approximately 0.75 of line periods in the intervening frames. This is indicated in Figures 4*m* and 4*n* in which the vertical dotted lines represent the beginnings of line periods. The pulses from the multivibrator control the stepped-waveform generator 60 by means of a switching and differentiating circuit 61 similar to the circuit 8 . . . 17 of Figure 1, but the pulses fed to the circuit 61 for initiating the increments of the stepped-waveform potential are not double-line frequency pulses from the oscillator 1, but line frequency pulses fed in positive sense from the generator 2. The output from the generator 60 is therefore a stepped-waveform potential each of whose steps has a duration of a line period as indicated in Figure 4*p*, the potential increments being synchronised with the beginnings of the lines. The waveform has, moreover, the same number of steps in alternate frames. The output of the generator 60 is fed to a circuit 62 similar to the combined circuits 20 . . . 22 and 25 . . . 30 of Figure 1, and the circuit 62 feeds paraphase version of the waveform *p*, in which a suitable D.C. component has been established, to two combining circuits 63 and 64 similar to the circuit 31 . . . 35 of Figure 1. The output of circuit 63 is a waveform indicated at Figure 4*q* having a most positive level 65 while the output of 64 is a waveform indicated at Figure 4*r* having a most positive level 66. The waveforms *q* and *r* are fed to a multivibrator 67 so as to initiate alternate transitions thereof and the suppression pulses are taken, in dependence upon the polarity desired, from the anode circuit of one or other of the valves of the multivibrator. The suppression pulses are indicated in Figure 4*s* and as shown are of equal durations in successive line periods.

In the waveforms illustrated in Figures 2 and 4 the frame frequency suppression, keying and black-out pulses have, for convenience of illustration, been shown as having a duration of only a few line periods but it will be understood that in practice their duration would be much longer. It will also be appreciated that the apparatus illustrated can be readily modified to allow for the generation of other pulses of frame frequency, where necessary. The present invention is, moreover, not limited to television apparatus since it may find application in radar equipment and pulse-multiplex systems.

What I claim is:

1. Electrical pulse generating apparatus for generating, under the control of periodic master pulses, periodic pulses of a frequency lower than that of said master pulses, comprising means for dividing the frequency of said master pulses to generate keying pulses of said lower frequency, a normally inoperative step-waveform generator responsive, when operative, to said master pulses for generating a multistepped waveform having potential increments initiated by said master pulses, means for applying said keying pulses to render said waveform generator operative at intervals recurring at said lower frequency, and a pulse generator responsive to said stepped waveform to generate output pulses of said lower frequency timed by steps in said stepped waveform.

2. Electrical pulse generating apparatus for generating, under the control of periodic master pulses, periodic pulses of a frequency lower than that of said master pulses, comprising means for dividing the frequency of said master pulses to generate keying pulses of said lower frequency, a normally inoperative step-waveform generator responsive, when operative, to said master pulses for generating a multistepped waveform having potential increments initiated by said master pulses, means for applying said keying pulses to render said waveform generator operative at intervals recurring at said lower frequency, a pulse generator responsive to said stepped waveform to generate output pulses of said lower frequency, said pulse generator including a trigger device having two states of equilibrium, means for changing said trigger device from one state of equilibrium to another on the occurrence of one step in said step-waveform to initiate one of said output pulses, and means for changing said trigger device back to said first state on the occurrence of a subsequent step in said stepped waveform to terminate said output pulse.

3. Electrical pulse generating apparatus for generating, under the control of periodic master pulses, periodic pulses of a frequency lower than that of said master pulses, comprising means for dividing the frequency of said master pulses to generate keying pulses of said lower frequency, a step-waveform generator, a gate responsive to said keying pulses to admit master pulses to said step-waveform generator at intervals recurring at said lower frequency, said step-waveform generator being responsive to admitted master pulses to generate one cycle of a multistepped waveform having potential increments initiated by said master pulses during each interval, and a pulse generator responsive to said stepped waveform to generate output pulses of said lower frequency with the leading and trailing edge of each pulse initiated by different steps in the same cycle of said stepped waveform.

4. Electrical pulse generating apparatus for generating, under the control of periodic master pulses, periodic pulses of a frequency lower than that of said master pulses, comprising a trigger device having two states of equilibrium, means for dividing the frequency of said master pulses to change said trigger device from one state of equilibrium to the other at said lower frequency, a step-waveform generator, a gate responsive to said trigger device to admit master pulses to said step-waveform generator when the trigger device is in said other state of equilibrium, said step-waveform generator being responsive to admitted master pulses to generate a multistepped waveform having potential increments initiated by master pulses and including resetting means for terminating a cycle of the stepped waveform after a predetermined number of steps, means responsive to said resetting means for restoring said trigger device to said first state of equilibrium on termination of a cycle of said stepped waveform, and a pulse generator responsive to said stepped waveform to generate output pulses of said lower frequency timed by steps in successive cycles of said stepped waveform.

5. Electrical pulse generating apparatus for generating, under the control of periodic master pulses, periodic pulses of a frequency lower than that of said master pulses, comprising means for dividing the frequency of said master pulses to generate keying pulses of said lower frequency, a normally inoperative step-waveform generator responsive, when operative, to said master pulses for generating a multistepped waveform having potential increments initiated by said master pulses, means for applying said keying pulses to render said waveform generator operative at intervals recurring at said lower frequency, a plurality of pulse generators for generating a series of output pulses, means responsive to the step-waveform generator for separately controlling each pulse generator to cause the pulses of each series to have their leading and trailing edges initiated by different steps in said stepped waveform.

6. In television equipment operating with interlaced scanning and including a source of master pulses of twice line frequency, frame frequency pulse generating apparatus, comprising means for dividing the frequency of said master pulses to generate keying pulses of frame frequency, a step-waveform generator, a gate responsive to said keying pulses to admit said master pulses to said step-waveform generator at intervals recurring at frame frequency, said step-waveform generator being responsive to admitted master pulses to generate one cycle of a multistepped waveform having potential increments initiated by said master pulses during each interval, and a pulse generator responsive to said stepped waveform to generate output pulses of frame frequency with the leading edge and trailing edge of each pulse initiated by different steps in the same cycle of said stepped waveform.

7. In television equipment operating with interlaced scanning so that twice line frequency is an odd multiple of frame frequency, and including a source of pulses of twice line frequency, means for dividing the frequency of said twice line frequency pulses to generate keying pulses of frame frequency, a normally inoperative step-waveform generator responsive, when operative, to said master pulses to generate a multistepped waveform having potential increments initiated by trailing edges of said master pulses, means for applying said keying pulses to render said step-waveform generator operative at intervals recurring at frame frequency to generate one cycle of said stepped waveform in each interval, a frame pulse generator responsive to said stepped waveform to generate output pulses of frame frequency having their leading and trailing edges timed by steps in successive cycles of said stepped waveform, and a line pulse generator responsive to said master pulses to generate line output pulses of duration shorter than that of said master pulses and initiated by leading edges of alternate master pulses, whereby said line and frame output pulses never overlap.

8. Electrical pulse generating apparatus comprising a source of controlling pulses, a normally inoperative step-waveform generator, means for dividing said controlling pulses to generate pulses of lower frequency and of a duration of a plurality of periods of said controlling pulses, means for applying said lower frequency pulses to said step-waveform generator to render said generator operative for the duration of each lower frequency pulse to generate a multistepped waveform variation under the control of said controlling pulses with the timing of each increment determined by one of said controlling pulses, means for producing paraphase versions of said stepped waveform variation, means for combining said paraphase versions to produce a composite variation of stepped waveform having an extreme level contemporaneous with one step of said first stepped waveform variation, separate means for combining said paraphase versions to produce composite variation of stepped waveform having a step of extreme level contemporaneous with a later step in the same cycle of said stepped waveform variation, a trigger circuit having two limiting conditions, and means for applying said first and second composite variations to said trigger circuit to cause the step of extreme level in said first composite variation to change said trigger circuit from one limiting condition to the other and to cause the step of extreme level in the other composite variation to return the circuit to its first limiting condition to generate a sequence of pulses of said lower frequency with the leading edge and trailing edge of each pulse of said sequence timed by said controlling pulses.

ERIC LAWRENCE CASLING WHITE.

References Cited in the file of this patent

UNITED STATES PATENTS

| Number | Name | Date |
|---|---|---|
| 2,261,762 | Hazeltine | Nov. 4, 1941 |
| 2,428,913 | Hulst | Oct. 14, 1947 |
| 2,450,360 | Schoenfeld | Sept. 28, 1948 |
| 2,472,774 | Mayle | June 7, 1949 |